United States Patent [19]

Hiscott

[11] 4,170,065
[45] Oct. 9, 1979

[54] MARINE AZIMUTH AND INTERCEPT PLOTTER INSTRUMENT

[76] Inventor: Donald W. Hiscott, 434 E. Randolph St., Glendale, Calif. 91207

[21] Appl. No.: 933,112

[22] Filed: Aug. 11, 1978

[51] Int. Cl.$^2$ ............................................. B43L 7/00
[52] U.S. Cl. ...................................... 33/431; 33/1 N; 33/482
[58] Field of Search ................ 33/75 R, 1 N, 108, 26, 33/104, 76 VA

[56] References Cited

U.S. PATENT DOCUMENTS

| D. 165,849 | 2/1952 | Jordan | 33/174 B X |
| 2,013,603 | 9/1935 | Dalton | 33/76 VA |
| 2,216,490 | 10/1940 | Garrett | 33/75 R |

*Primary Examiner*—Harry N. Haroian
*Attorney, Agent, or Firm*—J. L. Jones

[57] ABSTRACT

A flat sheet annular ring has a first exterior circular perimeter and a concentric interior circular perimeter. The annular ring has the 360 circular degree compass scale indicia disposed thereon, at least adjacent to the ring interior circular perimeter, with appropriate compass one degree (1°) intervals. A single flat sheet circular inner disc, having a second exterior perimeter, is disposed inside the interior circular perimeter of the ring, having a snug rotatable fit in the ring. The single disc has at least one set of multiple narrow width linear parallel slots disposed through the thickness of the disc. The at least one set of multiple parallel slots are disposed symmetrically about the center of the single inner disc. A center aperture marks the disc center, sized to accept an indicia marker tip. A constant space interval, equivalent to at least a unit of one minute (1") scale distance on a selected scalar sized marine navigation map, separates each one of the multiple parallel slots of the at least one set of slots in the disc from each other and from the center of the inner disc. The width of the parallel slots of the at least one set of slots accepts a pencil point or the like marker. The parallel slots of the at least one set of slots each have a first terminus and a second terminus disposed inside the second exterior perimeter of the inner disc. A compass point indicia is disposed on the disc adjacent to the disc second exterior perimeter and extends across and through the center of the inner disc, and is disposed normal to the parallel slots.

5 Claims, 7 Drawing Figures

MARINE AZIMUTH AND INTERCEPT PLOTTER INSTRUMENT

BACKGROUND OF THE INVENTION

1. Field of the Invention

The invention teaches and claims a navigational instrument suitable for marine ship celestial navigation on a large body of water. The invention is classified in Class 33 Subclasses 75 and 76.

2. Description of the Prior Art

C. Freda, in U.S. Pat. No. 3,393,457 issued July 23, 1968, discloses a chart board having a frame with a large diameter opening found therein and a course protractor supported in the opening. The protractor includes an outer graduated ring rotatably supported in the opening and an inner ring member supported in the opening by the outer ring member.

In U.S. Pat. No. 2,216,490 issued Oct. 1, 1940, R. V. Garret disclosed and claimed an aircraft navigational instrument adapted to directional navigation from radio stations of known location. A plate has indicia thereon suitable for aligning the plate with map meridian lines, a first means rotatable with respect to the plate for compensating for compass deviation from true north, a second means rotatable with respect to the first means for indicating an aircraft's compass heading, and a pair of slotted discs, each having a plurality of parallel slots therein. The pair of slotted discs are rotatable with respect to each other. The pair of discs are adapted to indicate on the above second means the directions to points of known positions.

H. M. Jensen, in U.S. Pat. No. 2,004,951 issued June 18, 1935, discloses and claims a navigational instrument for aircraft, having a head and stern portions, together with a compass rose secured in an aperture in the head portion.

SUMMARY OF THE INVENTION

This marine navigational azimuth and intercept plotter has a flat sheet annular ring, with a first exterior circular perimeter and a concentric interior circular perimeter. The annular ring has the 360 circular degree compass scale indicia disposed thereon, at least adjacent to the ring interior circular perimeter, with appropriate compass one degree (1°) intervals. A flat sheet circular inner disc, having a second exterior perimeter, is disposed inside the interior circular perimeter of the annular ring, having a snug rotatable fit in the annular ring.

The inner disc has at least one set of multiple narrow width linear parallel slots disposed through the thickness of the flat sheet disc. The at least one set of multiple parallel slots are disposed symmetrically about the center of the inner disc. A center aperture marks the disc center, and is sized to accept an indicia marker tip. A constant space interval, equivalent to at least a unit of one minute (1") scale distance on a selected scalar sized marine navigation map, separates each one of the multiple parallel slots of the at least one set of slots in the disc from each other and from the center of the disc. The width of the parallel slots of the at least one set of slots accept a pencil point or the like marker. The parallel set of slots each have a first terminus and a second terminus disposed inside the second exterior perimeter of the disc. A compass point indicia is disposed on the disc adjacent to the disc second exterior perimeter and extends across and through the center of the disc, normal to the parallel slots.

A separate interchangeable inner disc with at least an equivalent of at least a unit of one minute (1") spacing interval between the at least one set of multiple parallel slots and the disc center can be provided for each selected navigation map to be used. One modification of the inner disc embodies one set of multiple, parallel slots disposed symmetrically about the center aperture of the disc, and having the slot aperture separated by a constant space interval equivalent to one minute (1") of scale distance on a selected scalar size marine navigation map. A second modification of the inner disc embodies two sets of multiple, parallel slot apertures disposed in parallel sets of slot apertures and also disposed as symmetrical separate sets about the center aperture of the disc. Each one of the two sets of slot apertures are separated by a constant space interval equivalent to a plurality of two minutes (2") of scale distance on a selected scalar sized marine navigation map. The two sets of slot apertures are disposed in separate half-circle sectors of the inner disc, in odd and even scalar sets of numerical values of spaced two minute intervals, beginning with one minute (1") in one set of slot apertures and two minutes (2") in the second set of slot apertures.

Included in the objects of this invention are:

To provide a simple, compact plotter instrument for determining the position of boats and ships on navigable waters, utilizing celestial sightings.

To eliminate the use of parallel rules, triangles and dividers in determining the position of a boat and ship in navigable waters.

To eliminate the need for an azimuth line plot when three sights have been taken by a navigator using this invention.

Other objects and advantages of this invention are taught in the following description and claims.

BRIEF DESCRIPTION OF THE DRAWINGS

The description of this invention is to be read in conjunction with the following drawings.

DESCRIPTION OF THE PREFERRED EMBODIMENT OF THE INVENTION

Figure 1:
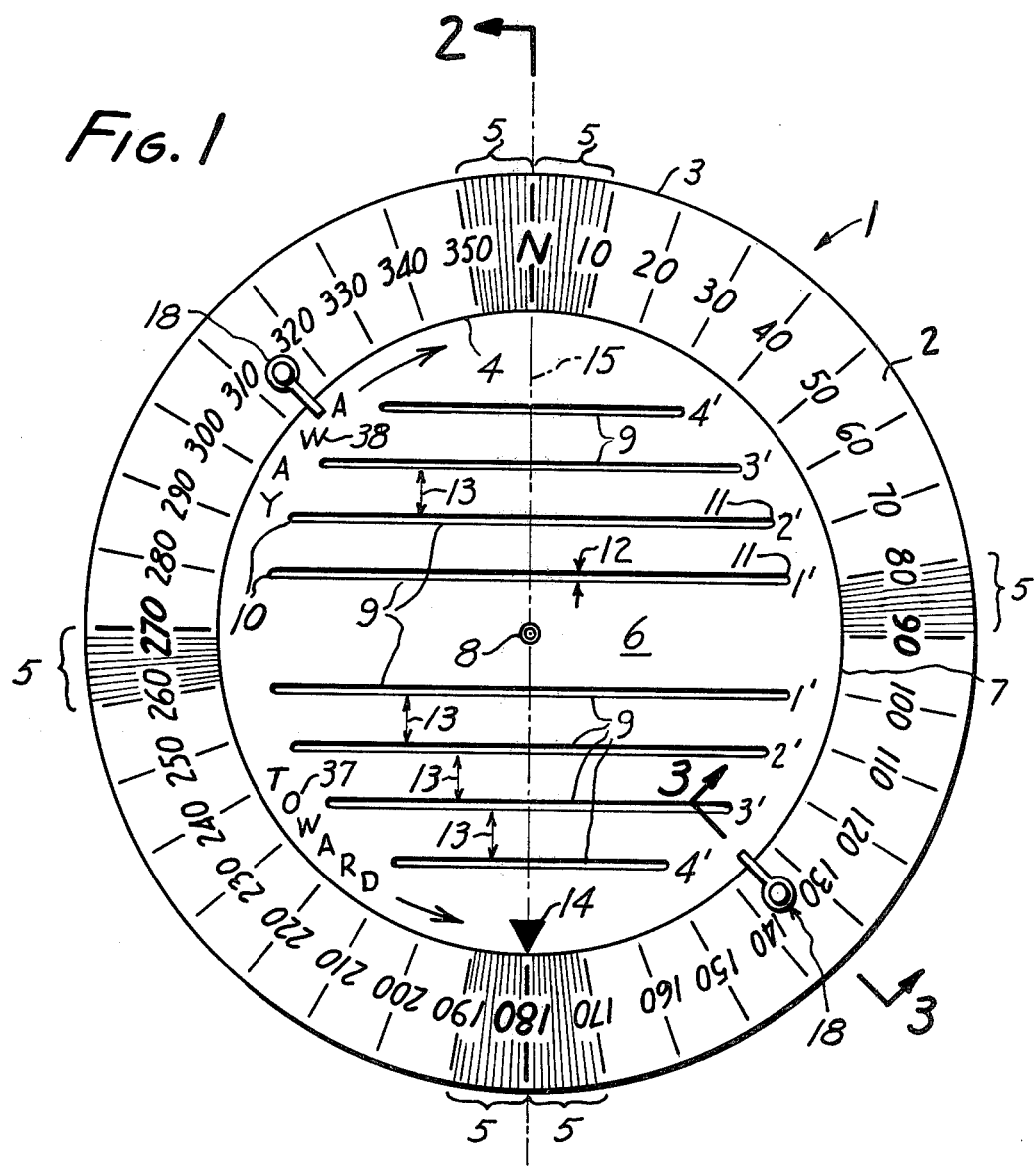
FIG. 1 is a plan view of the azimuth and intercept plotter instrument of this invention.
Figure 2:
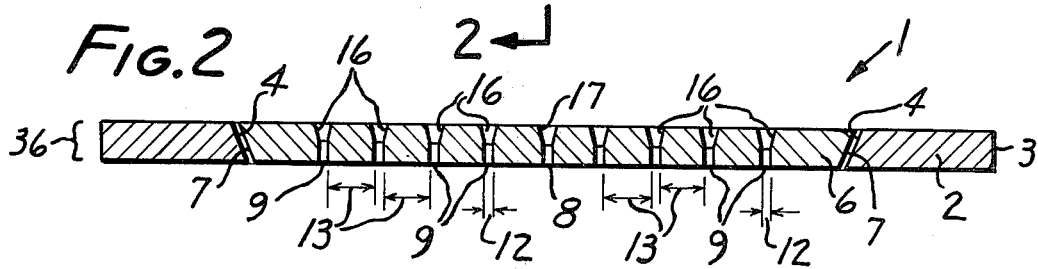
FIG. 2 is a section view through 2—2 of FIG. 1.
Figure 3:
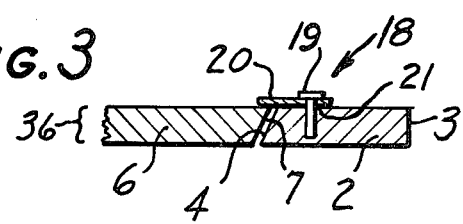
FIG. 3 illustrates a sectional view of a retainer and fastener means through 3—3 of FIG. 1, securing the pair of the flat annular ring and the flat inner disc together as a planar mating rotatable pair.

Referring to FIGS. 1 and 2 in detail, the marine navigational azimuth and intercept plotter instrument 1 has a flat sheet external annular ring 2, which has a first exterior circular perimeter 3 and a concentric interior circular perimeter 4. The annular ring 2 has 360° circular compass scale indicia 5 disposed on the ring 2, at least adjacent to the ring interior circular perimeter 4, with the appropriate compass one degree (1°) intervals marked on the ring 2.

A flat sheet circular inner disc 6 has a second exterior perimeter 7, and disc 6 has a snug rotatable fit in the ring 2. A center aperture 8 is disposed through the thickness 36 of disc 6, and 8 is sized to accept an indicia marker tip, such as a pencil point or ball point pen. A set of multiple narrow width linear parallel slot apertures 9 are disposed through the thickness 36 of the disc 6. The slot apertures 9 are disposed symmetrically about the center aperture 8. Each one of the slot apertures 9 has a first terminus 10 and a second terminus 11 disposed inside of the disc 6. Each one of the slot apertures 9 has a slot width 12 sized to accept an indicia marker. Each one of the parallel slot apertures 9 are separated from each other and from the center aperture 8 of the disc 6 by a spaced interval which is equivalent to one minute (1.0") of arc on the scale distance on a selected scalar sized marine pilot navigation map. A compass heading indicia 14 and radial extension line 15 through the disc center aperture 8 are both disposed normal to the parallel slot apertures 9.

In FIG. 2, wedge cross sectional shaped apertures 16 are disposed above each one of the slot apertures 9, providing easy access of the indicia marker pencil tip or ball point pen tip to the slot apertures 9. A conical aperture 17 disposed above the center aperture 8 provides easy access to 8. The conical mating pair of circular first interior perimeter 4 and second exterior perimeter 7 are secured in a rotatable fit by a disc retaining means 18, having a pivot pin 19 permanently secured in ring 2 and securing a rotatable spring retainer lever 20 through the lever aperture 21, holding disc 6.

In FIG. 1, an arrow and indicia TOWARD 37, together with an opposing arrow and indicia AWAY 38, mark the disc 6.

Figure 4:
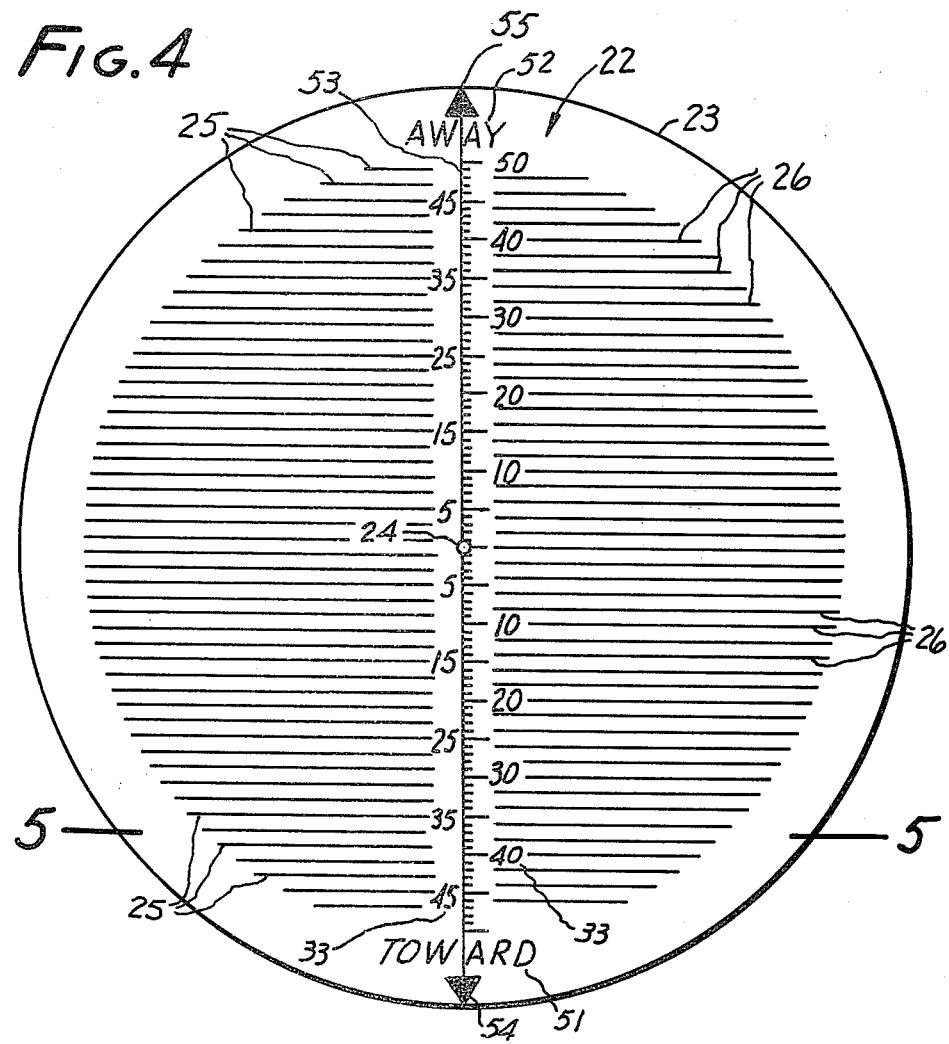
FIG. 4 illustrates a modification of an inner disc wherein two sets of slot apertures are disposed in the disc in separate odd and even scalar sets of numerical values of spaced two minute intervals. A disc bridge separates the two sets of slot apertures.
Figure 5:
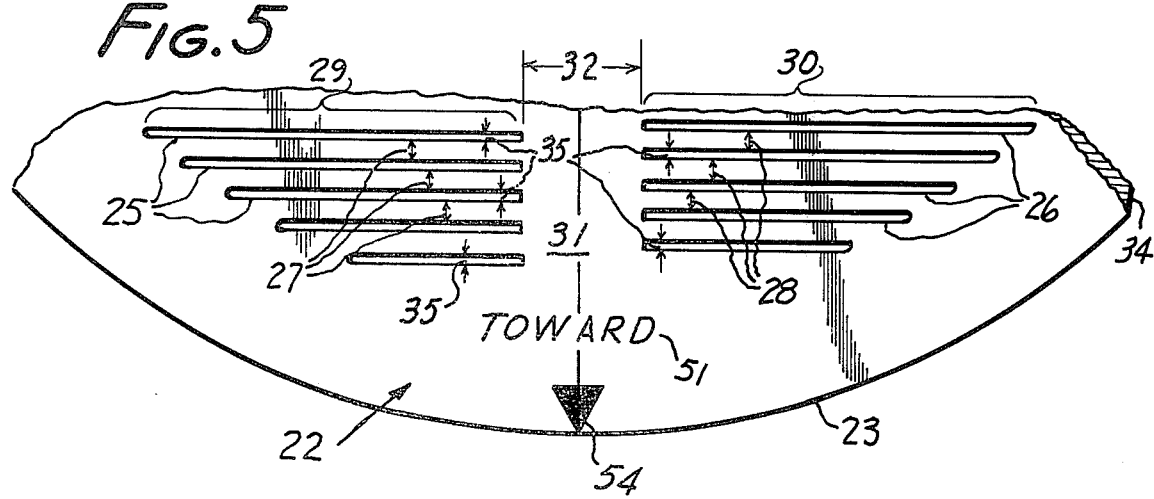
FIG. 5 is an enlarged view through 5—5 of FIG. 4.

A modification of inner disc 6 is further illustrated in FIGS. 4 and 5, wherein the modified disc 22 has an exterior circular perimeter 23 and a center aperture 24. Two parallel groups of parallel sets of slot apertures, a first set of multiple set of slot apertures 25, and a second set of multiple slot apertures 26 are disposed in disc 22. The two groups of parallel sets of slot apertures 25 and 26 are each typically separated by a constant spaced interval equivalent to two minutes (2.0") values on a selected scalar navigation map, the constant spaced interval being 27 for the set of slot apertures 25, and the constant spaced interval being 28 for the set of slot apertures 26. The set of slot apertures 25 have slot lengths 29, and the set of slot apertures 26 have slot lengths 30. Each set of slot apertures 25 and 26 have a columnar diametrical bridge 31 disposed across disc 22, and separating the abutting slot apertures 25 and 26. Numerical one minute (1.0") indicia are disposed on the bridge 31, providing scalar one minute (1.0") values as measured from the center aperture 24. The second set of slot apertures 26 are indexed on the center aperture 24, and apertures 26 are spaced 28 an equivalent two minutes (2.0") apart. The first set of slot apertures 25 are disposed in constant spaced two minute (2.0") scalar intervals 27, and each slot aperture 25 is advanced one minute (1.0") in position with respect to a diametrical projection through center aperture 24, over the position of a corresponding slot aperture 26.

The slot apertures 25 and 26 have a width 35, suitable for admitting an indicia marker pencil or the like. Indicia TOWARD, 51, and AWAY, 52, together with the compass heading indicia 53, 54 and 55 disposed through the center aperture 24, complete the disc 22. The spaced intervals 27 and 28 are typically two minutes (2.0") on a selected scalar map, and can be typically other plural units, such as 3, 4 and 5 minutes (3, 4, 5") as needed for a specific map. Each set of slot apertures 25 and 26 are disposed in a separate semicircular sector of disc 22. The thickness 34 of disc 22 is the value needed for easy handling and typically can be 2.0 to 5 mm. The material of construction of 22 can be transparent plastic or metal, such as brass, admiralty metal, or the like.

Figure 6:
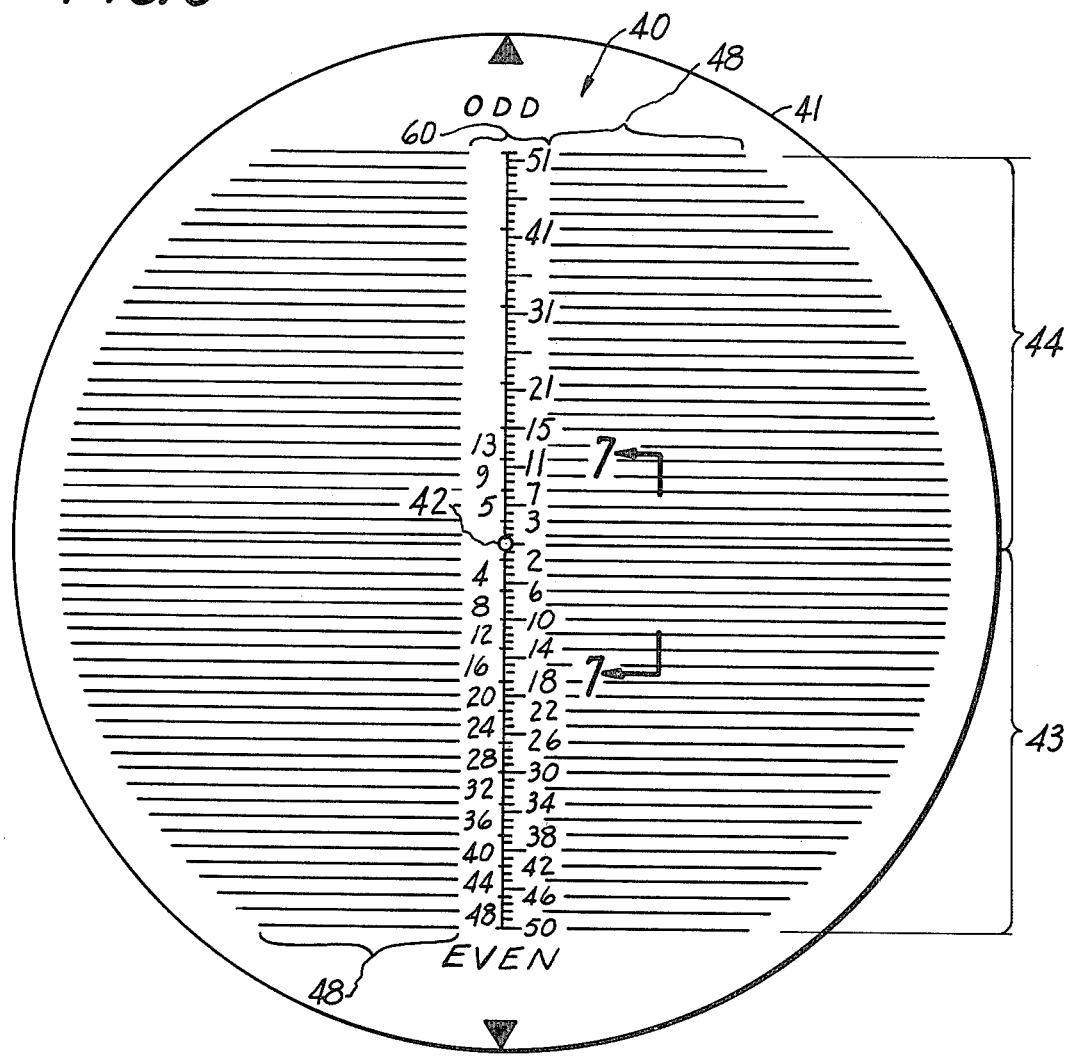
FIG. 6 illustrates still another modification of the inner disc wherein another two sets of slot apertures are disposed in opposed semi-circular sectors of the disc, and each set of slot apertures has an equivalent two minute (2") spaced interval separating each slot aperture in a set of apertures.
Figure 7:
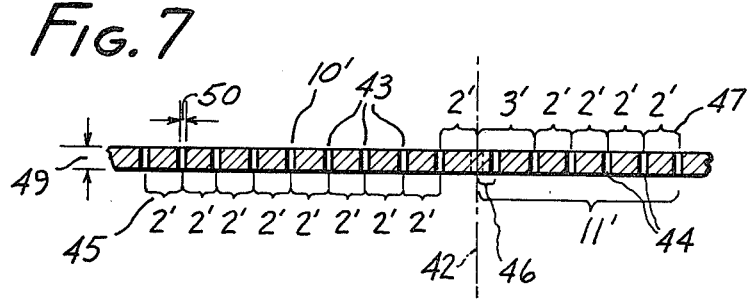
FIG. 7 illustrates a cross-sectional view through 7—7 of FIG. 6.

Another modification of an inner disc 40 is illustrated in FIGS. 6 and 7. The disc 40 has second exterior circular perimeter 41 and a center aperture 42. A first set of multiple parallel slot apertures 43 are disposed in a semicircular sector, and a second set of multiple parallel slot apertures 44 are disposed in the other semicircular sector of disc 40. Each set of apertures 43 and 44 extend in parallel sets across the disc 40 terminating inside the disc 40, as in disc 22. A columnar diametrical bridge 60 is disposed across the disc 40, providing minute (") scalar indicia and a strengthening support member for the abutting slot apertures 43 and 44. 60 is similar in construction to bridge 31 of FIGS. 4 and 5. The two sets of slot apertures are disposed on equivalent two minute (2.0") scalar map intervals, within each separate set 43 and set 44. Set 43 is disposed a two minute (2.0") scalar map interval 45 from disc center aperture 42. Set 44 is disposed a one minute (1.0") scalar map interval 46 from disc center aperture 42, as illustrated in more detail in FIG. 7, and by two minute (2") intervals 47. The slot apertures 43 and 44 have typical lengths 48 and widths 50. The disc 40 has a typical thickness 49. The columnar diametrical disc bridge 60 is bisectingly disposed through the first set of slot apertures 43 and the second set of slot apertures 44.

The marine azimuth and intercept plotter instrument of this invention greatly simplifies the instruments required to plot a marine vessel's position by the intercept method. Typically the sun's timed altitude is measured. An assumed ship position is plotted on a well known universal position plotting sheet at an assumed latitude. The plotting instrument 1 is laid on the plotting sheet with center aperture 8 at the assumed vessel position and the compass markings 5 of 90° and 270° of ring 2 are disposed on the chosen latitude. The compass point indicia 14 of the inner disc 6 is rotated to the timed sextant observed azimuth of the celestial body, such as the sun, moon, star or planet, as measured on the compass markings of ring 2. The observed timed sextant reading is then compared with the assumed nautical almanac reference sextent reading and the value difference in minutes is utilized to mark a position line for the vessel. The marked position line is the line generated in the slot aperture 9 corresponding to the above value difference in minutes. If the observed sextant reading is larger than the assumed sextant reading, the position line is TOWARD as indicated on disc 6. If the observed sextant reading is smaller, the position line is AWAY, as indicated on disc 6. By utilizing the celestial observation timed sextant readings for two celestial bodies, an intercept position of the two vessel position lines provides the exact vessel position. Conversely the plotter instrument 1 can be used to lay off a vessel course.

The inner discs 22 and 40 can replace disc 6 for use in waters where a small position plotting sheet is used. Typically much intercostal navigation is done utilizing a six inch diameter compass rose plotting sheet wherein the one nautical mile (1.0") is scaled at 1/20 inch. Discs 22 and 40 can be useful, providing two sets of scalar values for this small compass rose.

Many modifications in the marine azimuth and intercept plotter instrument can be made in the light of my teachings. It is understood that within the scope of the claims, the invention can be practiced otherwise than as described.

I claim:

1. A marine navigational azimuth and intercept plotter instrument combination comprising:

a flat sheet external annular ring having a first exterior circular perimeter, and an interior circular perimeter concentric with said first exterior perimeter, said annular ring having 360° compass marking indicia disposed on said annular ring at least adjacent to said interior circular perimeter, said compass marking divided at least into one degree (1°) values and, a single flat sheet circular inner disc having a second exterior circular perimeter, said disc disposed in and snugly rotatable inside said interior circular perimeter of said external annular ring, said circular inner disc having a center aperture disposed through the flat inner disc thickness, said aperture sized and adapted to accomodate a marker point, said single circular inner disc having multiple linear slot apertures disposed through said disc thickness and also disposed in parallel equal fixed spaced intervals from said center aperture, each said linear slot aperture having a first terminus and a second terminus disposed inside said inner disc adjacent to said inner disc second exterior perimeter, and each said slot aperture having a width sized and adapted to accommodate a marker point, said parallel equal space intervals being equivalent to a navigation map scalar value of not less than one minute (1.0") of compass value of a specific navigation map, said single circular inner disc having a compass heading line disposed on said disc normal to said multiple parallel linear slot apertures and having a radial extension through said center aperture of said disc.

2. In the combination set forth in claim 1, the further modification wherein said flat sheet external annular ring and said single flat sheet circular inner disc each have straight taper opposed mating edges at aforesaid interior circular perimeter and aforesaid second exterior perimeter, and have fastener retainer means securing said annular ring and said inner disc together at said straight taper mating edges.

3. A marine navigation azimuth and intercept plotter instrument has a flat sheet external annular ring having a first exterior circular perimeter and an interior circular perimeter concentric with said first exterior perimeter, said annular ring having 360° compass marking indicia disposed on said annular ring and said compass indicia sub-divided into at least one degree (1°) values, and a single flat sheet circular inner disc having a second exterior circular perimeter, said disc disposed in and snugly rotatable inside said interior circular perimeter of said external annular ring, whereby the improvement combination comprises:

said single circular inner disc having a center aperture disposed through the flat inner disc thickness, said aperture sized and adapted to accommodate a marker point, said single circular inner disc having multiple linear slot apertures disposed through said disc thickness and disposed in parallel equal fixed spaced intervals from said center aperture, each said linear slot aperture having a first terminus and a second terminus disposed inside said inner disc, adjacent to said inner disc second exterior perimeter, and each said slot aperture having a width sized and adapted to accommodate a marker point, said parallel equal space intervals being equivalent to a navigation map scalar value of one minute (1.0") compass value of a specific navigation map, said single circular inner disc having a compass heading line disposed on said disc normal to said multiple parallel linear slot apertures and having a radial extension through said center aperture of said disc.

4. A marine navigation azimuth and intercept plotter instrument has a flat sheet external annular ring having a first exterior circular perimeter and an interior circular perimeter concentric with said first exterior perimeter, said annular ring having 360° compass marking indicia disposed on said annular ring and said compass indivia sub-divided into at least one degree (1°) values, and a flat sheet circular inner disc having a second exterior circular perimeter, said disc disposed in and snugly rotatable inside said interior circular perimeter of said external annular ring, whereby the improvement combination comprises:

said circular inner disc having a center aperture disposed through the flat inner disc thickness, said aperture sized and adapted to accommodate a marker point, said circular inner disc having two parallel groups of parallel multiple sets of slot apertures disposed through said disc thickness and each one of said two parallel groups disposed in a parallel first set of slot apertures and a parallel second set of slot apertures, each one of said first set and said second set of slot apertures being disposed in a half-circle sector of said inner disc, said parallel first set of slot apertures being disposed in constant spaced scalar intervals of two minutes (2") equivalent on a navigation map, beginning with a one minute (1") spaced scalar interval from said center aperture, said parallel second set of slot apertures being disposed in constant spaced scalar interval of two minutes (2") equivalent on a navigation map, beginning with a two minute (2") spaced scalar interval from said center aperture, both said first set of slot apertures and said second set of slot apertures each having a first set of terminus disposed adjacent to said inner disc second exterior perimeter, and each said first set of slot apertures and said second set of slot apertures each having a second set of terminuses disposed adjacent to a columnar diametrical disc bridge disposed across the inner disc, said first set of slot apertures and said second set of slot apertures having a width sized and adapted to accommodate a marker point, and, said inner disc having a compass heading line disposed on aforesaid disc bridge normal to the said two parallel first set of slot apertures and second set of slot apertures, and having a radial extension disposed through said center aperture of said disc, and one minute (1.0″) scalar equivalent map interval numerical indicia disposed on said disc bridge.

5. In the combination set forth in claim 4, the further modification wherein said columnar diametrical disc bridge is bisectingly disposed through the said first set of slot apertures and said second set of slot apertures.

* * * * *